(12) United States Patent
Sheng-Hsiung et al.

(10) Patent No.: US 6,590,766 B2
(45) Date of Patent: Jul. 8, 2003

(54) MOUNTING STRUCTURE FOR DATA STORAGE DEVICE

(75) Inventors: Cheng Sheng-Hsiung, Taipei (TW); Tu Cheng, Taipei (TW); Li Chao-Kang, Taipei (TW)

(73) Assignee: Aopen Inc. (TW)

( * ) Notice: Subject to any disclaimer, the term of this patent is extended or adjusted under 35 U.S.C. 154(b) by 58 days.

(21) Appl. No.: 09/895,419

(22) Filed: Jul. 2, 2001

(65) Prior Publication Data

US 2002/0080573 A1 Jun. 27, 2002

(30) Foreign Application Priority Data

Dec. 22, 2000 (TW) ........................................ 89222328 U

(51) Int. Cl.⁷ ................................................. G06F 1/16
(52) U.S. Cl. .................... 361/685; 361/683; 312/223.1; 360/137
(58) Field of Search ................................. 361/679–386, 361/724–727; 312/223.1, 333; 248/636, 367, 633, 634, 616; 360/97.01, 78.01, 137; 369/75.1–79

(56) References Cited

U.S. PATENT DOCUMENTS

| | | | | |
|---|---|---|---|---|
| 5,510,955 A | * | 4/1996 | Taesang ....................... 361/685 |
| 5,730,515 A | * | 3/1998 | Ho ............................... 361/727 |
| 5,995,364 A | * | 11/1999 | McAnally et al. ........... 361/685 |
| 6,111,755 A | * | 8/2000 | Park ............................ 361/685 |
| 6,313,985 B1 | * | 11/2001 | Chen et al. .................. 361/685 |
| 6,341,059 B1 | * | 1/2002 | Kohler et al. ................ 361/685 |
| 6,373,695 B1 | * | 4/2002 | Cheng ......................... 361/685 |
| 6,388,875 B1 | * | 5/2002 | Chen ........................... 361/685 |

* cited by examiner

Primary Examiner—Darren Schuberg
Assistant Examiner—Lisa Lea-Edmonds
(74) Attorney, Agent, or Firm—Michael D. Bednarek; Shaw Pittman LLP

(57) ABSTRACT

The invention disclosed a mounting structure for supporting data storage device via sliding and securing mechanisms, wherein sliding rails and at least one securing hole are installed to each parallel side of the data storage device. The mounting structure comprises a case, one pair of sliding slots and at least one recess. The case serves as a container for the data storage device. One pair of sliding slots, formed at internal side of the case is arranged for the sliding rails of the data storage device to slide onto. The recess, formed at external side of the case, is next to an opening formed through the case thereof. When the data storage device slides in the case, the position of the opening is in line with the position of the securing hole thereof. As a result, the data storage device is mounted to the case through the opening and the securing hole with screws.

10 Claims, 6 Drawing Sheets

MOUNTING STRUCTURE FOR DATA STORAGE DEVICE

The present application claims priority to Taiwan application No. 089222328 entitled "Mounting structure for data storage device" filed on Dec. 22, 2000.

BACKGROUND OF THE INVENTION

1. Field of the Invention

This invention generally relates to mounting structure, and in particular to mounting structure of data storage device via sliding and securing mechanisms.

2. Description of the Related Art

Conventionally, a data storage device is arranged in a case and mounted to a case via securing the data storage device to the case with screws fastening going through the case and the data storage device into securing holes. In which, the case has to fit exactly the size of the data storage device for screw securing. The other conventional solution for mounting the data storage device is to provide sliding slots and sliding rails. Sliding rails are provided at the outer side panel of the data storage device. Via sliding slot provided at the internal side panel of the case, sliding rails of the data storage device slide onto sliding slot into the case. Furthermore, latches are available for enhancing securing between the sliding rails and the sliding slots.

Up to today, existing mounting structure adapts either a screw fastening or a sliding rails approach. None such structure can accommodate both methods in one application. Due to the fact that sliding rails are provided at the outer side panel of the data storage device, as the data storage device slide into the case via the sliding slots provided at the internal side panel of the case, a gap is formed between the data storage device and the side panels of the case. As a result, screws, which fasten into the securing hole through side panels of the case to the data storage device, become loose.

SUMMARY OF THE INVENTION

In light of the attempt to combine screw fastening and sliding rails approach, the invention discloses a mounting structure utilizing both mounting approaches screw fastening and sliding rails used in the prior art.

Sliding rails and at least one securing hole are attached at two parallel sides of the data storage device. The mounting structure comprises a case, where a pair of sliding slots and at least one recess is formed on the case. The case serves as a container for the data storage device to mount onto the housing. Sliding slots formed at the internal side panels of the case, used for the sliding rails of the data storage device to slide onto. Recess formed at the external side panels with a recess through the panel of the case. As a result, when the data storage device slides into the case, a screw is fastened going through the opening and the securing hole and mount the data storage device onto the case.

The sliding slot comprises at least one pair of supporting members, which has an upper bracket and a bottom bracket for supporting the sliding rails mounted at sides of the data storage device.

In addition the position of the bottom side of the sliding rails are in line with the position of the bottom side of the data storage device when fastening the sliding rails onto the data storage device. Moreover, bottom bracket is expandable to form a bottom plate to support the data storage device. Accordingly, upper edge of the sliding rails and the bottom of the data storage device together with the upper bracket and bottom bracket of the case form a sliding rails-sliding rails slot mechanism.

Alternatively, with bottom bracket of the case extended to form a bottom plate of the data storage device, data storage device is disposed thereupon. Then, with a screw going through the opening of the recess and securing hole at sides of the data storage device, the data storage device is mounted to the case.

BRIEF DESCRIPTION OF THE DRAWINGS

The following detailed description, which is given by way of example, and not intended to limit the invention to the embodiments described herein, can best be understood in conjunction with the accompanying drawings, in which.

DETAILED DESCRIPTION OF THE INVENTION

Figure 1:
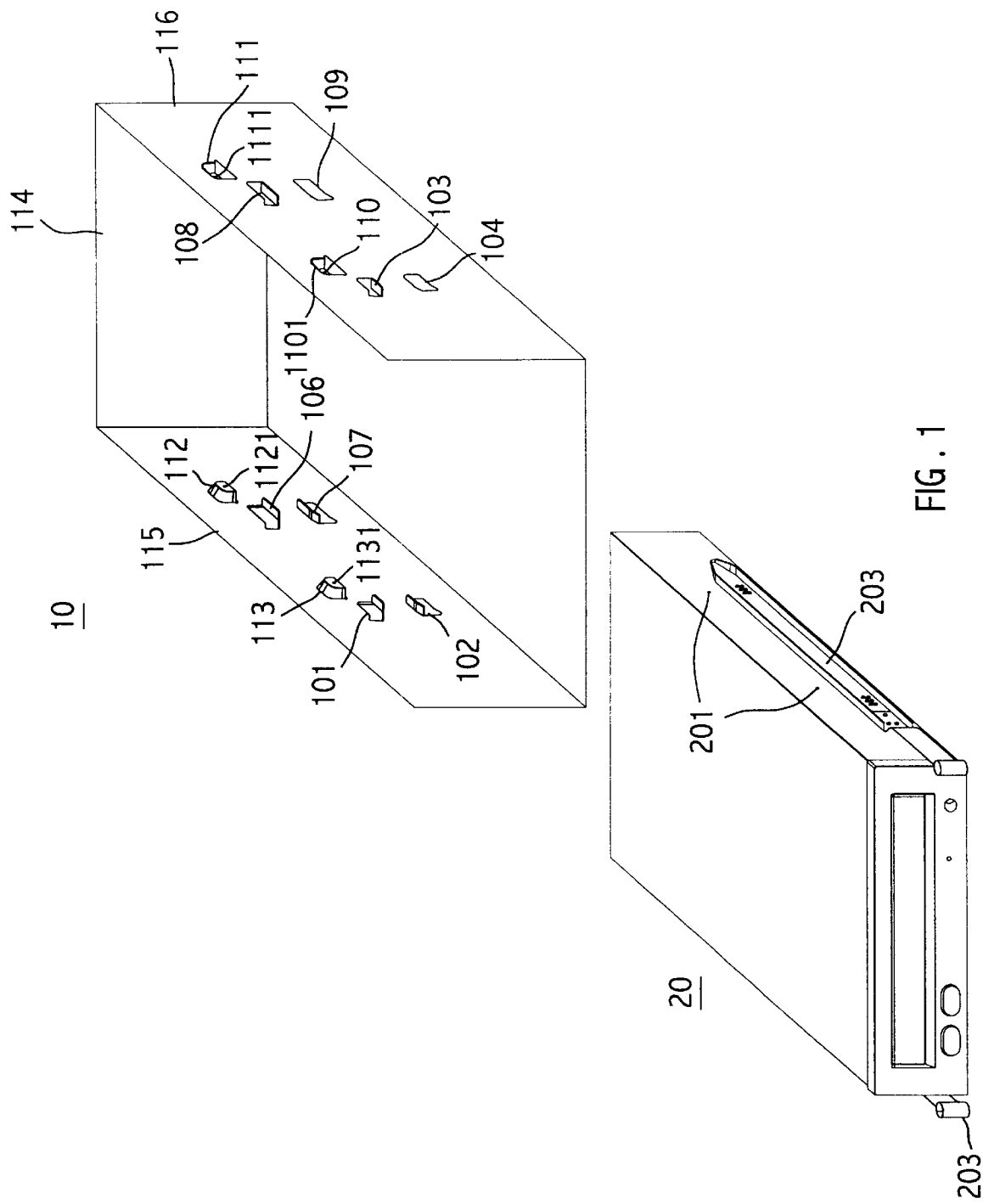
FIG. 1 is an elevational view of the mounting structure and data storage device of the first embodiment in accordance with the present invention.

In accordance with the present invention, FIG. 1 shows a mounting structure 10, used for supporting a data storage device 20 via sliding and securing mechanisms. Sliding rails 203 and at least one securing hole 201 are installed at each parallel side of the data storage device 20. As shown in the FIG. 1, there are two securing holes 201 at each parallel side of the data storage device 20. Mounting structure 10 comprises: a case 114, one pair of sliding slots and recesses 110, 111, 112 and 113. The case 114 serves as a container for the data storage device 20, which comprises side panels 115 and 116. Sliding slot comprises at least one pair of supporting members.

As shown in FIG. 1, each supporting member has an upper bracket 101 and a bottom bracket 102. There are two pairs of supporting members in the FIG. 1, where two upper brackets 101, 103 and their corresponding bottom brackets 102, 104 form one pair of the supporting members, and two upper bracket 106, 108 and their corresponding bottom bracket 107, 109 form the other pair of the supporting members. The supporting members are provided for supporting and accepting sliding rails 203 at sides of the data storage device 20. The upper bracket and bottom bracket are formed by metal pressing side panel 115 and 116. Recesses 110, 111, 112, 113 are also formed by metal pressing side panel 115 and 116 and at the same time make openings at recesses 110, 111, 112, 113 which is named the openings 1101, 1111, 1121, 1131 respectively going through side panels 115, 116 of the case 114.

Figure 2:
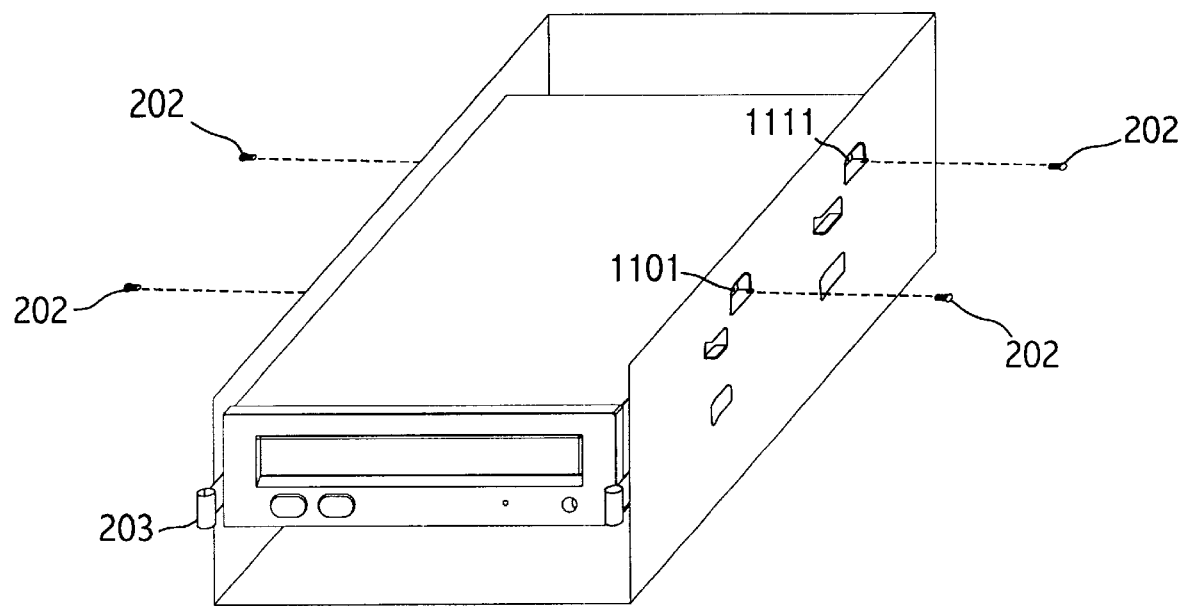
FIG. 2 is an assembly view of the mounting structure and data storage device of the first embodiment in accordance with the present invention.

When the data storage device 20 slides into the case 114, due to the recess 10, 111, 112, 113, the openings 1101, 1111, 1121, 1131 is located right next to external sides of the data storage device 20. Additionally, positions of the recesses 110, 111, 112, 113 correspond to the positions of securing holes 201. As FIG. 2 shows, with screws 202 go through the openings 1101, 1111, 1121, 1131 and securing holes 201, the data storage device 20 is thus mounted to the case 114.

Figure 3:
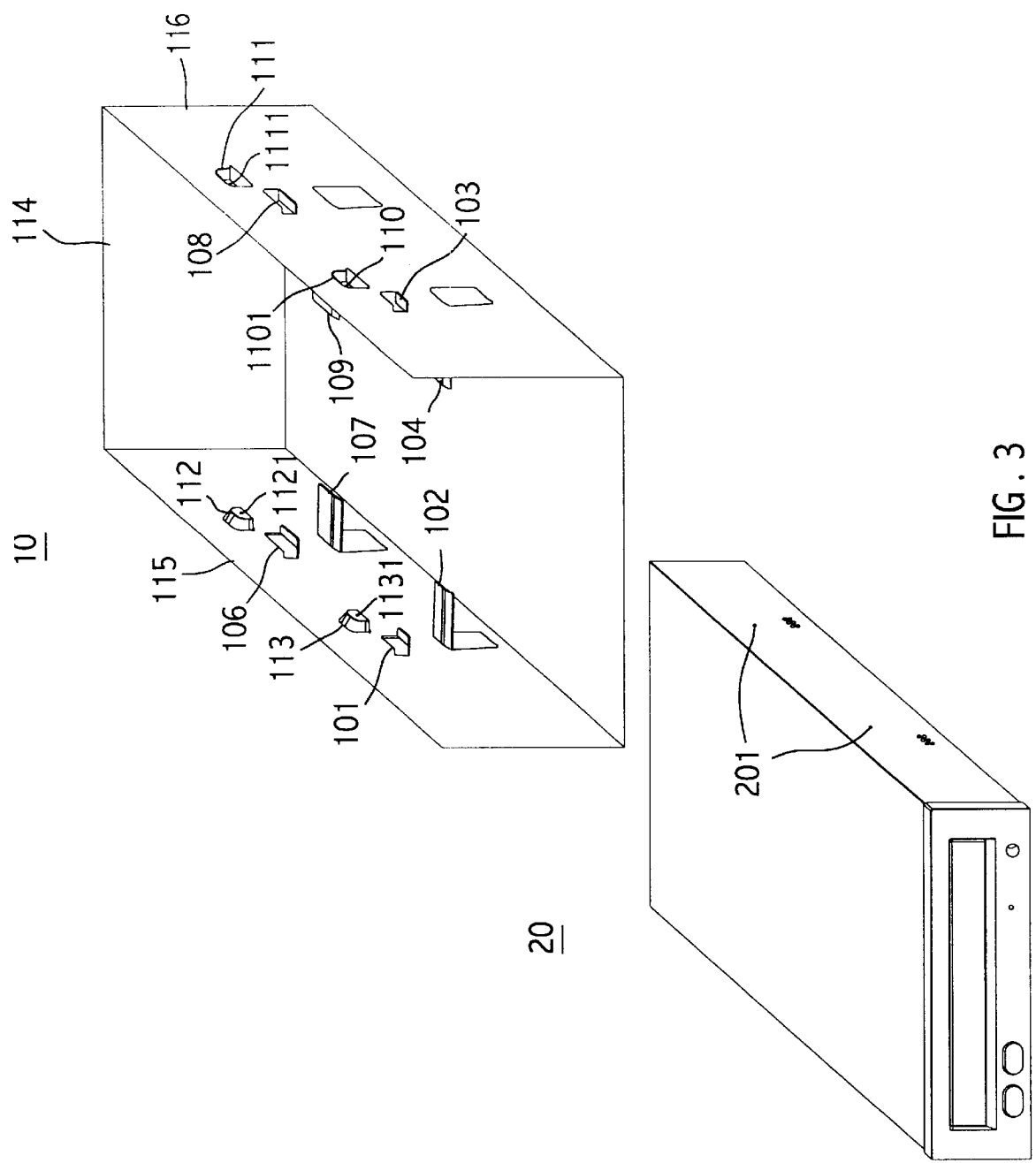
FIG. 3 is an elevational view of the mounting structure and data storage device of the second embodiment in accordance with the present invention.

Alternatively, by extending the length of the bottom bracket 102, 107, 104, 109 as shown in FIG. 3 to form a bottom plate for supporting the data storage device 20. Then, instead of using sliding rails 203 from the data storage device 20, with the bottom plate, the data storage device 20 is disposed onto the case 114. As shown in the FIG. 4, when the data storage device 20 is disposed on the case 114, the screw 202 then go through the openings 1101, 1111, 1121, 1131 and securing holes 201 to fasten the data storage device 20 onto the case 114.

Figure 4:
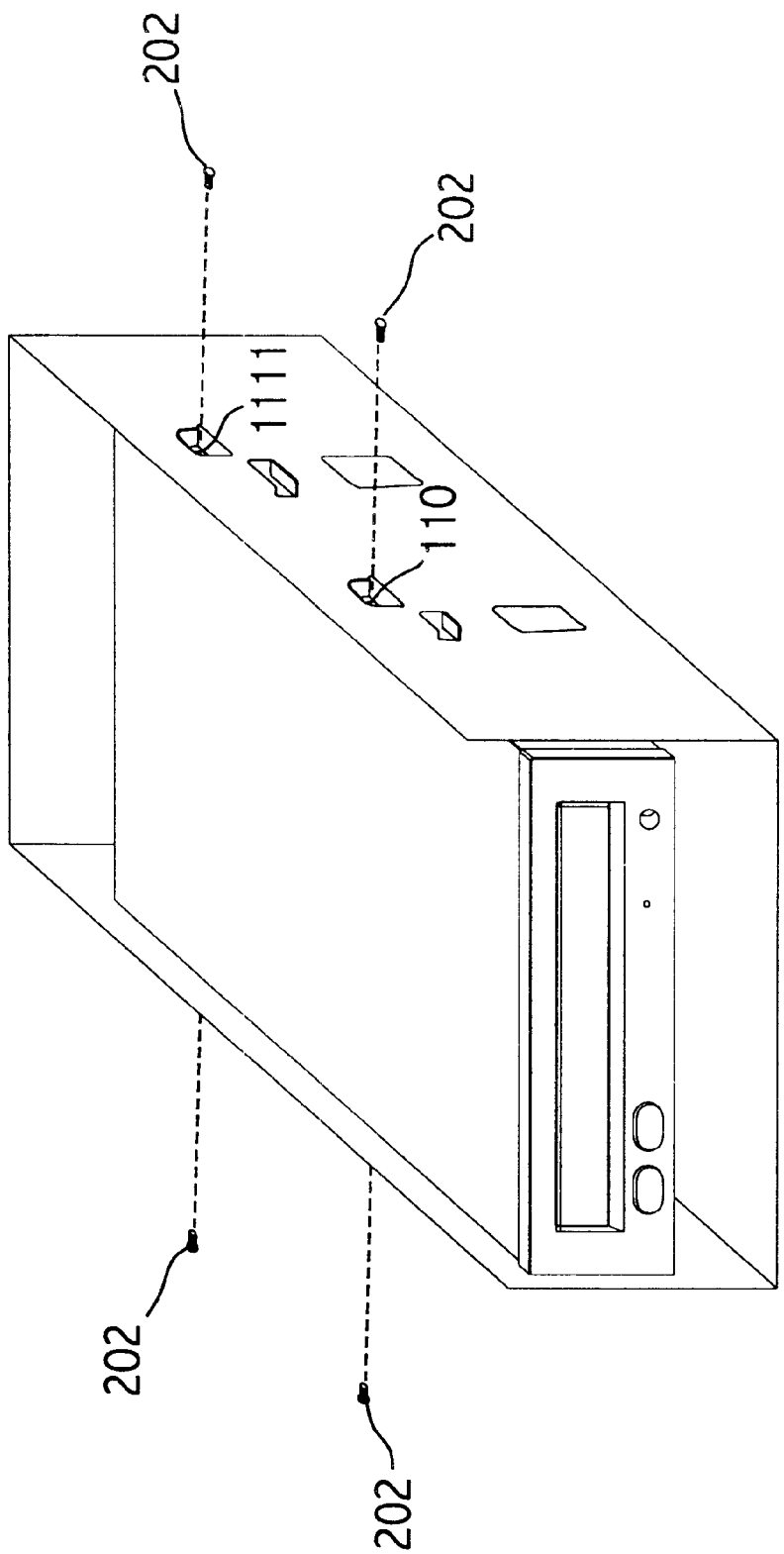
FIG. 4 is an assembly view of the mounting structure and data storage device of the second embodiment in accordance with the present invention.
Figure 5:
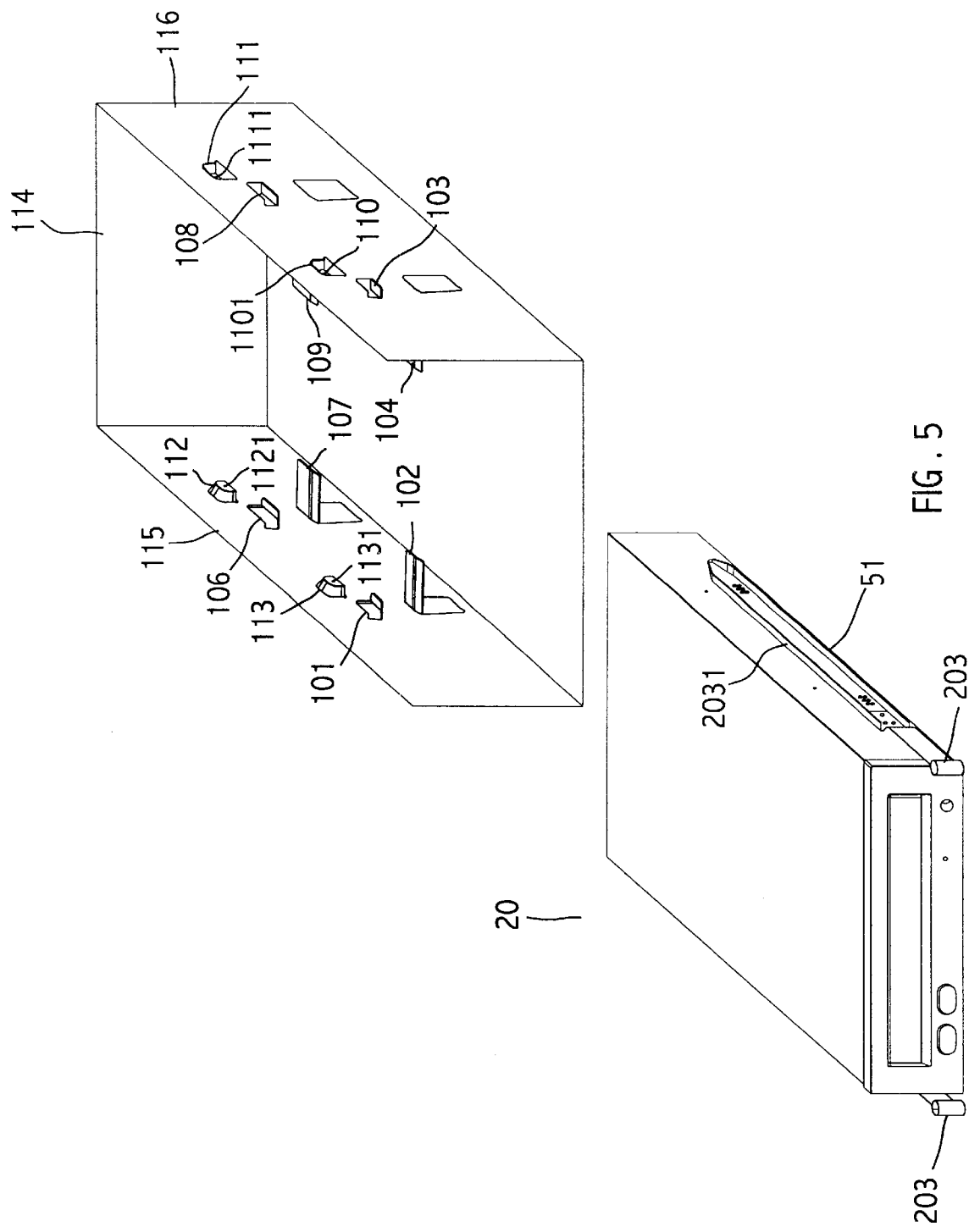
FIG. 5 is an elevational view of the mounting structure and data storage device of the third embodiment in accordance with the present invention.

In the FIGS. 3 and 4, the bottom plate can also apply to the situation if it is desired to slide the data storage device 20 into case 114 with the sliding rails 203. However, as shown in FIG. 5, the installation of the sliding rails 203 has to be under conditions such as apart from the rule that the sliding rails 203 are installed at each parallel side of the data storage device 20.

Figure 6:
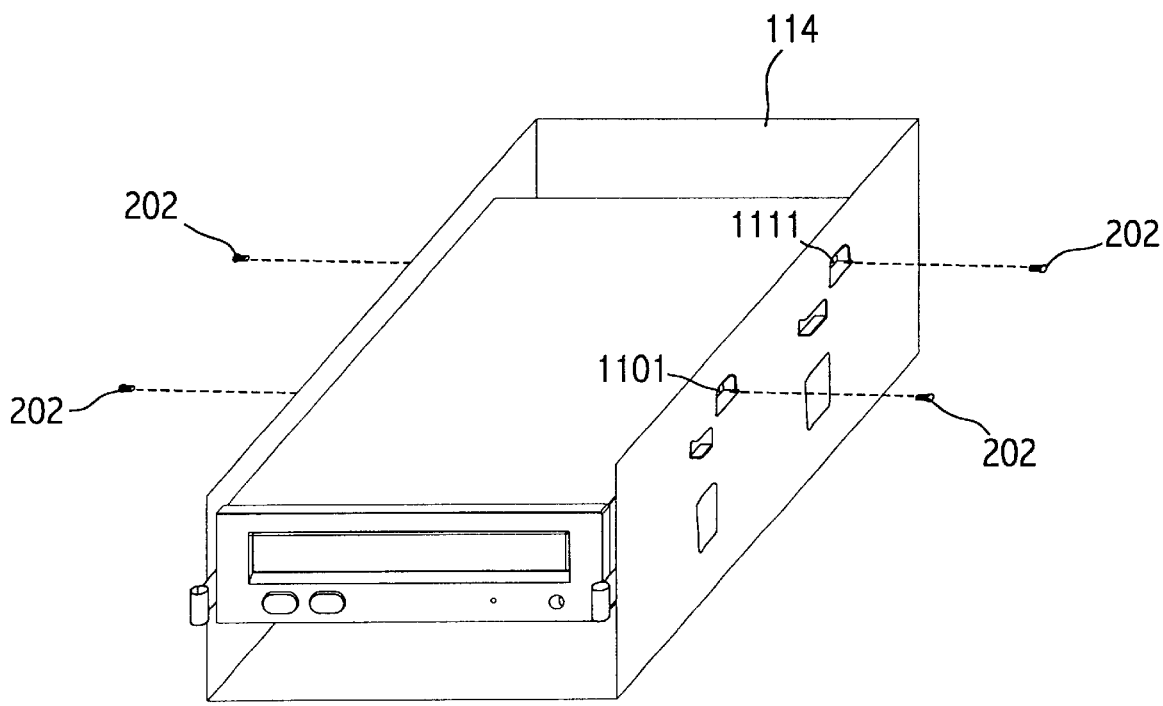
FIG. 6 is an assembly view of the mounting structure and data storage device of the third embodiment in accordance with the present invention.

In addition, the lower edge of the sliding rails 203 has to be in line with the lower side 51 of the data storage device 20 so that the upper bracket 101, 106, 103, 108, the upper edge 2031 of the sliding rails 203, bottom of the data storage device 20 and the bottom bracket 102, 107, 104, 109 can serve as sliding slots for data storage device 20 to slide into. As shown in FIG. 6 when the data storage device 20 is disposed onto case 114, with the screws 202 going through the openings 1101, 1111, 1121, 1131 and the securing holes 201, the data storage device 20 is mounted onto the case 114. While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A mounting structure for supporting a data storage device via sliding and securing mechanisms, wherein the data storage device comprises sliding rails and at least one securing hole on each parallel side of the data storage device, the mounting structure comprising:

a case serving as a container for the data storage device;

one pair of sliding slots, formed at opposite internal sides of the case, for receiving the sliding rails of the data storage device; and at least one recess, formed on each external side of the case and extended inward toward the internal side of the case with an opening formed at an end face of the recess, wherein when the data storage device slides into the case, the end face of the recess is substantially right next to each parallel side of the data storage device, thereby filling a gap between each parallel side of the data storage device and the internal sides of the case, and the position of the opening corresponds to the position of the securing hole of the data storage device.

2. The mounting structure of claim 1, further comprising a fastening component for fastening the opening of the at least one recess with the securing hole of the data storage device.

3. The mounting structure of claim 1, wherein the sliding slot are formed by at least one pair of supporting members having a upper bracket and a bottom bracket for supporting the sliding rails.

4. The mounting structure of claim 3, wherein the bottom bracket is a bottom plate to support the data storage device.

5. The mounting structure of claim 4, wherein the position of the bottom bracket is in line with the position of a bottom side of the data storage device.

6. The mounting structure of claim 3, wherein the supporting member and recess are formed by metal pressing on the case.

7. A mounting structure for supporting a data storage device via sliding and securing mechanisms, wherein the data storage device comprises at least one securing hole on each parallel side of the data storage device, the mounting structure comprising:

a case serving as a container for the data storage device;

at least one pair of supporting members, formed at opposite internal sides of the case, for supporting the bottom of the data storage device when the data storage device is in the case; and at least one recess, formed on each external side of the case and extended inward toward the internal side of the case with an opening formed at an end face of the recess, wherein when the data storage device is placed in the at least one pair of support members, the end face of the recess is substantially right next to the parallel side of the data storage device, whereby filling a gap between each parallel side of the data storage device and the internal sides of the case, and the position of the opening corresponds to the position of the securing hole of the data storage device.

8. The mounting structure of claim 7, further comprising a fastening component for fastening the opening of the at least one recess with the securing hole of the data storage device.

9. The mounting structure of claim 7, wherein the supporting member comprises at least one bottom bracket and at least one upper bracket, wherein the bottom bracket is longer than the upper bracket to form a bottom plate to support the data storage device.

10. The mounting structure of claim 7, wherein the supporting members and recess are formed by metal pressing on the case.

* * * * *